United States Patent [19]

Wengler

[11] Patent Number: 4,665,513

[45] Date of Patent: May 12, 1987

[54] ARRANGEMENT FOR ERROR DETECTION FOR DISC-SHAPED INFORMATION CARRIERS

[75] Inventor: Rolf Wengler, Hanover, Fed. Rep. of Germany

[73] Assignee: Polygram GmbH, Fed. Rep. of Germany

[21] Appl. No.: 658,812

[22] Filed: Oct. 9, 1984

[30] Foreign Application Priority Data

Nov. 17, 1983 [DE] Fed. Rep. of Germany ....... 3341628

[51] Int. Cl.[4] ......................... G11B 5/09; G11B 20/10; G06F 11/00
[52] U.S. Cl. ......................................... 369/54; 371/20
[58] Field of Search ....................... 369/54, 55, 56, 59; 371/20; 324/210, 212

[56] References Cited

U.S. PATENT DOCUMENTS 4,562,577 12/1985 Glover et al. ........................ 369/54
4,571,716 2/1986 Szerlip .................................. 369/54

Primary Examiner—Vincent P. Canney

Attorney, Agent, or Firm—Hill, Van Santen, Steadman & Simpson

[57] ABSTRACT

It is necessary in the manufacture of high packing density, optically-readable, disc-shaped information carriers to undertake a continuous fabrication inspection of the disc with respect to manufacturing errors. Upon consideration of the fact that the information to be stored on the information carrier occurs in the form of an error-correcting code which is interpreted by an error correction system in the playback device during playback, it is proposed to base such an error detection device on commercially-available playback devices whose error correction systems, with respect to its error identification or error signal output, is connected via an interface to an error interpretation unit which, in turn, is sub-divided into error channels pertaining to different errors, and that, preferably, a plurality of such playback devices connected to error interpretation units via interfaces cooperate via an interrogation device with an error registration device shared in common by all error interpretation units.

10 Claims, 10 Drawing Figures

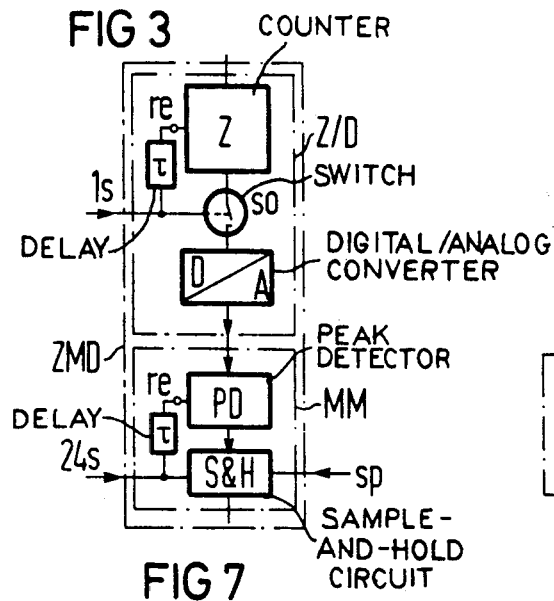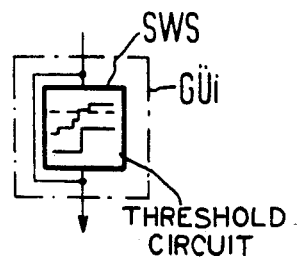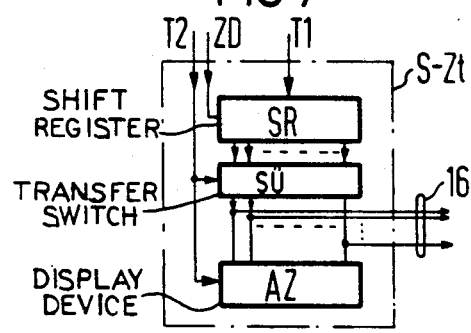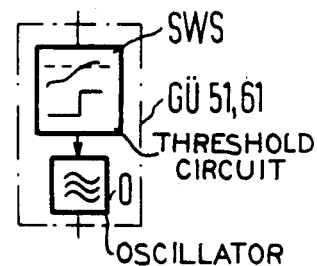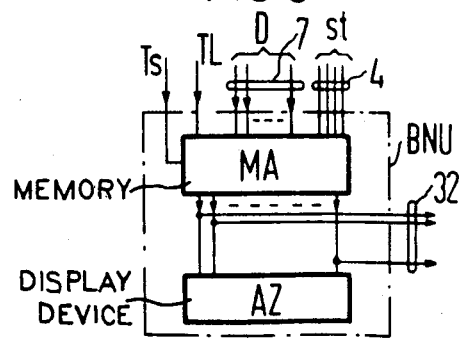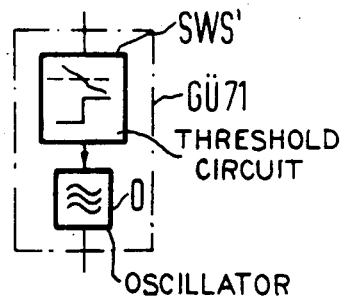

ARRANGEMENT FOR ERROR DETECTION FOR DISC-SHAPED INFORMATION CARRIERS

BACKGROUND OF THE INVENTION

1. Field of the Invention

The present invention relates to an arrangement for detecting fabrication errors in the manufacture of high-packing density, optically-readable, disc-shaped information carriers having information stored therein in the form of an error-correcting code, particularly compact discs.

2. Description of the Prior Art

Random sample type quality check are constantly required in the manufacture of disc-shaped information carriers in which a determination must be made as to whether the quality requirement to be made thereof are assured to an adequate degree in the playback of the information. Imperfections in the form of so-called "drop-outs" which are caused by dust and optical inhomogeneities of the plastic employed cannot be generally avoided given information tracks on the order of 1μ even given a very high state of the art. An error-correcting code has been employed for this reason in the digital signal recording for optically-readable audio discs which are on the market and which are referred to as compact discs, it being possible with the assistance of the error-correcting code to monitor the read-out code as to errors at the receiver upon playback of the information and to correct detected errors under given conditions. The efficacy of such an error correcting system at the playback side, of course, is not arbitrarily high, so that undesired, disruptive noise can also appear upon playback when the errors reach a magnitude that can no longer be governed by the error correcting system.

SUMMARY OF THE INVENTION

The object of the present invention is to provide an arrangement which enables a faultless, comprehensive detection of fabrication errors, including their interpretation, given a relatively low technical expense.

Proceeding from an apparatus configuration of the type initially described, this object is achieved, according to the present invention, in apparatus which is characterized in that at least one playback device is provided for the information carriers to be inspected, the error correction system of the playback device, particularly at least the error correction system assigned to the information, being connected with respect to its error indication or, respectively, error signal inputs via an interface to an error interpretation unit that is subdivided into various error channels. The indicated error information is acquired in the error interpretation unit in the various channels in a periodic, first cycle and respectively transferred to a maximum value memory having a following limit check module. Further, the maximum value memories are reset into their information-free, initial condition in a periodic, second cycle whose period duration amounts to a multiple of the period duration of the first cycle. Moreover, the error interpretation unit is followed via an interrogation device, by an error registration device. The interrogation device interrogates the error channel outputs of the error interpretation unit in a third cycle whose repetition period is the same as that of the second cycle and emits the interrogation results to the error registration device in the form of an error channel information block.

The invention is based on the perception that the error correction system provided at the playback side can be employed in an extraordinarily advantageous fashion with respect to its error indication or, respectively, error signal outputs for the detection and interpretation of fabrication errors. A comprehensive development of measuring instruments is therefore not required for the playback of the discs, including the error reporting signals, to be inspected, rather recourse may be directly taken to commercially-available playback equipment. Only one interface per playback device is thereby required, the actual error interpretation unit being connectible via the interface.

The conditions assume a particularly practical form when a plurality of playback devices equipped with error interpretation units via interfaces cooperate via an interrogation device having a common error registration device.

BRIEF DESCRIPTION OF THE DRAWINGS

Other objects, features and advantages of the invention, its organization, construction and operation will be best understood from the following detailed description, taken in conjunction with the accompanying drawings, on which:

FIGS. 3–8 are more detailed block diagrams of the particulars of the device illustrated in FIG. 2.

DESCRIPTION OF THE PREFERRED EMBODIMENTS

Figure 1:
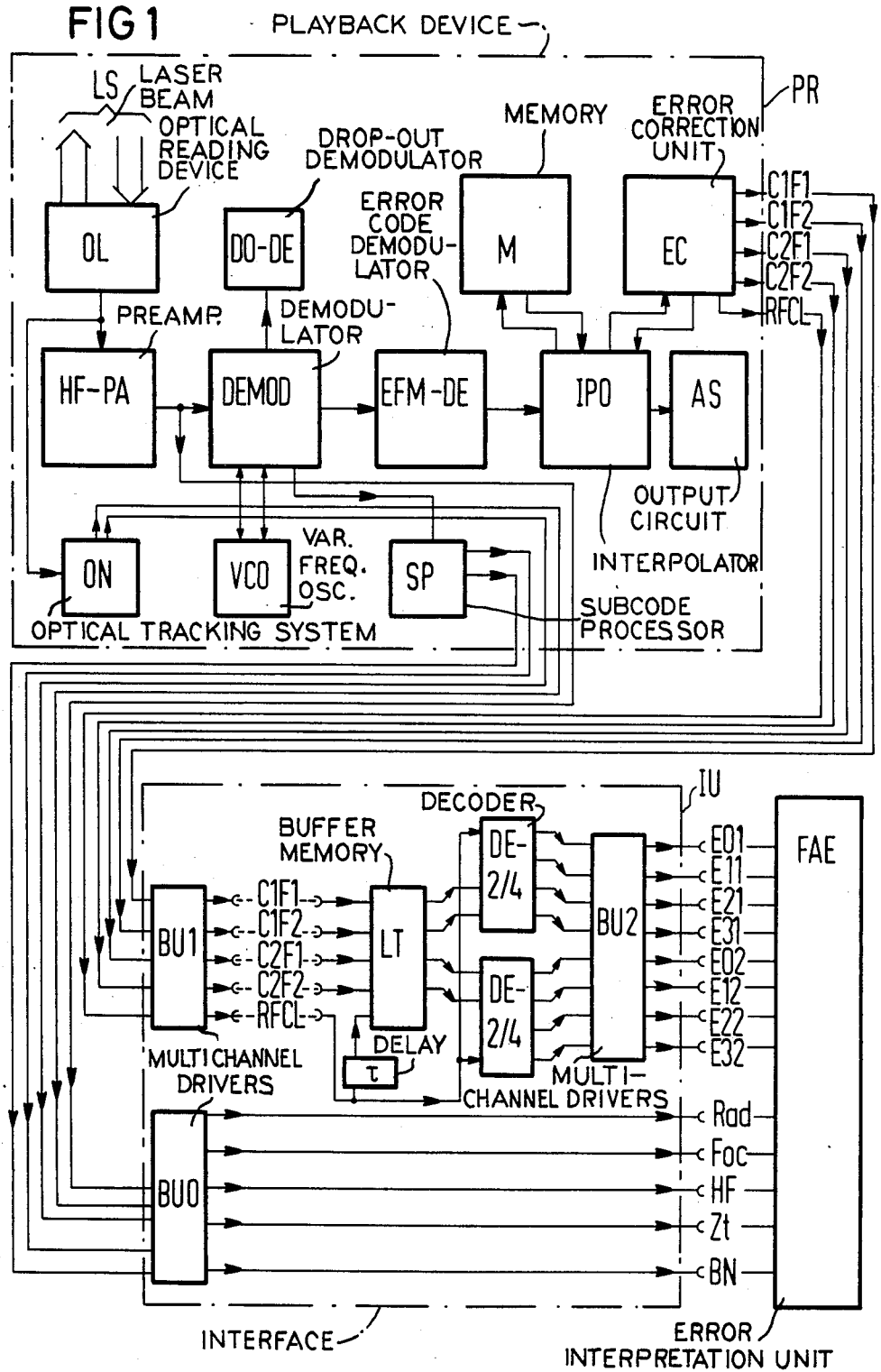
FIG. 1 is a schematic block diagram of a commercially-available playback device for compact discs which is equipped with an interface according to the present invention.

Referring to FIG. 1, the block diagram of the playback device PR corresponds to that of the Philips Player CD 100 which is commercially available. It comprises an optical reading device OL which senses the information track of a digital audio disc with the assistance of a laser beam LS and converts the result into a radio frequency signal in an optoelectrical transducer. The radio frequency signal is supplied to a high frequency pre-amplifier HF-PA, on the one hand, and to the optical tracking system ON, on the other hand, for beam focus and the radial control. The radio frequency preamplifier HF-PA is followed by a demodulator DEMOD which cooperates, at its input side, with a frequency-control oscillator VCO and, at its output side, with a drop-out demodulator DO-DE and a subcode processor SP. At its output, the error code demodulator EFM-DE is connected to an interpolator IPO which, in turn, cooperates with a memory M and the error correction unit EC. The radio frequency signal, error-corrected in the interpolator, is subsequently supplied to a further output circuit AS in which the digital signal is first reconverted into an analog level and is subsequently amplified in an audio amplifier. At its input side, the interface IU connecting the error interpretation unit FAF to the playback device PR consists of a multi-channel driver stage BU1 which is connected at its input side to the outputs C1F1, C1F2, C2F1, C2F2 and RFCL of the error correction unit EC. A further multiple driver stage BU0 is connected at its input side to the outputs of the optical tracker ON for the radial error signal and the focus error signal, and is also connected to the output of the radio frequency pre-amplifier HF-PA as well as to the outputs of the subcode processor SP for specification of time and order number. The appertaining outputs of the multiple driver stage BU0 are correspondingly referenced Rad for the radial error signal, Foc for the focus error signal, HF for the radio frequency output signal of the radio frequency pre-amplifier, Zt for the time signal output and BN for the order number output of the subcode processor SP.

The outputs C1F1 and C1F2 of the error correction unit EC report occurring errors of the so-called first correction level, i.e. they indicate errors that appear successively, namely up to a maximum of three errors. The outputs C2F1 and C2F2 of the error correction unit indicate errors which belong to the so-called second correction level, i.e. errors wherein more than three discrete errors appear in immediate succession. The output RFCL supplies a processing clock that the interface IU also requires for control.

As the interface IU further shows, the signals supplied from the outputs C1F1, C2F2, C2F1, C2F2 and RFCL of the error correction unit EC are supplied at the output side of the multiple driver stage BU1 to a buffer memory LT and which correspond to the inputs connections C1F1 and C1F2 are supplied to a decoder DE-2/4 which converts the signal supplied to two inputs into four outputs. In the same manner, the two output terminals of a buffer memory LT which correspond to the input terminals C2F1 and C2F2 are converted to four output terminals via a decoder DE-2/4. Across a multiple driver stage BU2, all output terminals of the two decoders DE-2/4 form error channel terminals E01, E11, E21, E31, E02, E12, E22 and E32, in addition to the error channel terminals Rad, Foc, HF, as well as the special channel terminals Zt and BN. Further, the processing clock at the terminal RFCL is directly supplied across the multiple driver stage BU1 to a decoders DE-2/4 for control. The decoders DE-2/4 can be realized, for example, by a Texas Instruments module 74139, the buffer memory LT by a Texas Instruments module 7495 and the multiple driver stage BU2 by the Texas Instruments module 74244.

Figure 2:
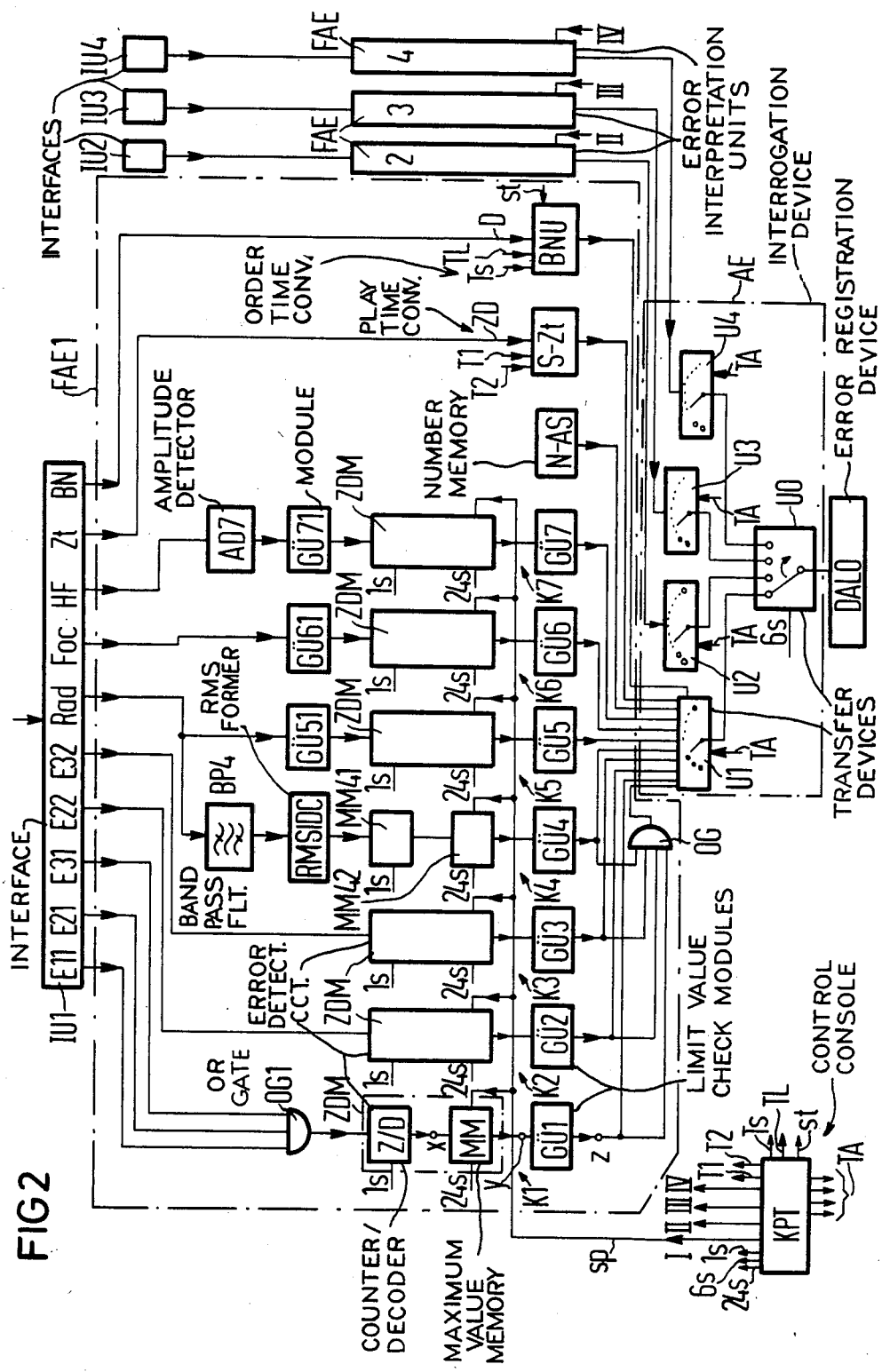
FIG. 2 is a block diagram representation of four error interpretation units for four playback devices, the units being assigned to a common registration device.

Referring to FIG. 2, the schematic block diagram illustrates the actual error interpretation arrangement for a maximum of four simultaneously operating playback devices. The appertaining error interpretation unit FAE1 is shown in greater detail for the first playback device having the interface IU1 and, at the same time, the output terminals which are of significance for the error interpretation unit FAE1 are indicated at the output side of the interface IU1. The interfaces IU2, IU3 and IU4 with the error interpretation units FAE2, FAE3 and FAE4 for the other three playback devices are only indicated in FIG. 2 by individual blocks. At their output sides, the error interpretation units FAE1, FAE2, FAE3 and FAE4 are connected via an interrogation device AE to an error registration device DALO which they share in common. Further, the error interpretation units and the interrogation device have a control console KPT assigned in common thereto, the control console KPT generating the timing and control clocks for the error interpretation units and for the interrogation device.

As the interface IU1 according to FIG. 2 shows, the error interpretation unit FAE1 interprets the signals appearing at the terminals E11, E21, E31, E22, E32, Rad, Foc, HF, Zt and BN. A signal at the terminal E11 means that the decoder DE-2/4 of FIG. 1 has detected a false symbol in the data block. The decoder DE-2/4 detects two false symbols when a signal appears at the terminal E21 and a decoder indicates more than two false symbols at the terminal E31. The decoder DE-2/4 of FIG. 1 assigned to the terminals C2F1 and C2F2 via the buffer memory LT has detected a false symbol in the data block, which false symbol belongs to the second correction level when a signal appears at the terminal E22. A signal at the terminal E32 means that the data block has more than two false symbols belonging to the second correction level.

Each of the output terminals of an interface can have an error channel assigned thereto in the appertaining error interpretation unit. Given the illustrative embodiment according to FIG. 2, the terminals E11, E21 and E31 are combined into a first error channel K1 via an OR gate OG1. The error channel K1 itself comprises a series connection of a counter Z/D having an output decoder, a maximum value memory MM and a limit value check module GU1. The counter thereby counts the error events and is reset into its initial condition with the clock 1s after every second. The decoded counter result is supplied to the maximum value memory MM which, in turn, merely retains the maximum value for 24 sec and is reset into its information-free initial condition after 24 seconds with the clock 24s. The maximum value stored in the maximum value memory MM is checked in the limit value check module GU1 as to whether its value transgresses a prescribed threshold and, insofar at this is the case, indicates the same at its output. In FIG. 2, the counter with the decoder Z/D and the maximum value memory MM are combined to form the error detection circuit ZDM. The terminal E22 of the interface IU1 is used for a second error correction channel K2 of the error interpretation unit FAE1. It, in turn, comprises the error detection circuit ZDM with a following limit value check module GU2. The analogous case applies to the terminal E32 of the interface IU1. In this error correction channel K3, the limit value check module is referenced GU3.

The terminal Rad of the interface IU1 which supplies the radial error signal is divided into two error channels K4 and K5 for the purpose of differing evaluation of the signal. In the error channel K4, the analog error signal is first supplied to a bandpass filter BP4 whose bandwidth is empirically defined within the limits of the range 500 Hz–2000 Hz. The bandpass filter BP4 also contains a band elimination filter in the form of a series-tuned wave trap whose resonant frequency lies at 650 Hz and which serves the purpose of suppressing the wobble frequency superposed on the radial error signal. The output signal of the bandpass filter BP4 is subsequently supplied to a root mean square formation stage RMS/DC which is connected at its output to a maximum value memory MM41. The maximum value memory MM41 corresponds to the counter Z with the following decoder D of the error detection circuit ZEM of the channels K1–K3 which is reset every second into its information-free initial condition by the clock 1s and respectively forwards the maximum value identified during this time interval to the maximum value memory MM2. The maximum value memory MM2 corresponds to the maximum value memory MM1 of the error detection circuit ZDM.

At its input, the error correction channel K5 comprises a limit value check module G51. As shall be explained in greater detail below, the limit value check module GU51 emits counting pulses as a function of the amplitude of the radial error signal, the counting pulses being acquired in the following error detection circuit ZDM and being subsequently interpreted in a limit value check module GU5 in the manner already described. The error channel K6 for the focused signal, which is likewise an analog signal, is acquired in the same manner as the analog radial error signal in the error channel K5. The limit value check module at the input of the error channel is referenced GU61 and the limit value check module at the output of the error channel is referenced GU6.

At its input, the error channel K7 of the error interpretation unit FAE1 for the radio frequency signal comprises an amplitude detector AD7. Following in series behind the amplitude detector AD7 are the limit value check module GU71, the error detection circuit ZDM and the limit value check module GU7. Apart from the amplitude detector AD7, the error channel K7 has practically the same structure as the error channels K5 and K6. The error interpretation unit FAE1, as well as the further error interpretation units FAE2, FAE3 and FAE4, also comprise a number memory N-AS for the number of playback devices assigned thereto. This number is manually written into the number memory once and is available at the output when the number memory is interrogated by the interrogation device. The terminal Zt of the interface IU1 forms a special channel in the form of a playing time converter S-Zt and which is simultaneously controlled by the control clocks T1 and T2 generated by the control console KPT.

The error interpretation unit FAE1 also comprises an order number converter BNU as a special channel to which the data D are supplied at its input via the terminal BN of the interface IU1 and which is also controlled by the clock Ts and T1. The clocks Ts and T1 are again supplied from the control console KPT.

As may also be seen, the outputs of the error channels K1, K2 . . . K4 are connected to the inputs of a four input OR gate OG which, like the outputs of all error channels including the special channels and the number memory for the playback device, is connected at its output to the first contact of a transfer device U1 of the interrogation device AE. In a corresponding fashion, the interrogation device AE comprises corresponding transfer devices U2, U3 and U4 for the other three error interpretation units FAE2, FAE3 and FAE4. The switch contacts of these four transfer devices U1, U2, U3 and U4 are connected to the contacts of a transfer device U0 whose switching contact, in turn, communicates with the input of the error registration device DALO. During a run which is shorter than 6 sec and is controlled by the clock TA, the transfer devices U1, U2 . . . U4 successively interrogate the output of the OR gate OG of the error channels K1-K4, the channels K5-K7, the number memory and the two special channels and output this information to the error registration device DALO in the form of an error information block. The transfer device U0 is reswitched in the timing sequence of 6 sec by the clock 6s, so that the four error interpretation units FAE1, FAE2 . . . FAE4 are interrogated once within the interval of 24 seconds.

In order to be able to flexibly design operations, the control console KPT comprises four control signal outputs I, II, III and IV for the four error interpretation units by way of which the error interpretation units can be selectively inhibited. As illustrated with reference to the block diagram of the error interpretation unit FAE1, inhibiting the error channels K1-K7 occurs by inhibiting the maximum value memory MM of the error detection circuit ZDM or, respectively, by inhibiting the maximum value memory MM42. That terminal of the OR gate sampled first by the appertaining transfer device U1, U2, U3 and U4 provides the possibility of only activating the error registration device DALO when a transgression of the limit value and, therefore, an error to be registered is indicated at the output of the OR gate OG. This is meaningful because, as shall be explained in greater detail with reference to FIG. 4, it is not only the values transgressing the thresholds defined in the limit value check modules which are indicated at the outputs of the limit value check modules, rather all other values appearing at the output of the maximum value memories can also appear at the outputs of the limit value check modules.

FIG. 3 illustrates the fundamental structure of an error detection circuit ZDM which comprises the series connection of a counter Z with a following digital-/analog converter D/A and a maximum value memory MMA. The clock 1s is thereby supplied to the counter Z at its reset input re via a delay element $\tau$. The clock 1s also controls the operating contact of a switch so by way of which the counter output is connected to the digital/analog converter D/A. The counter Z, to whose input the error events are supplied and which respectively adds up the counter events for one second, forwards the result to the digital/analog converter D/A via the switch so and is subsequently reset into its initial counter reading.

The maximum value memory MM comprises a peak detector PD which is followed by a sample-and-hold circuit S&H. The clock 24s is supplied to the peak detector PD at its reset input re via a delay element $\tau$. At the same time, the clock 24s represents the transfer clock for the sample-and-hold circuit S&H. The peak detector PD essentially comprises an input capacitor which is charged in 24 seconds to the highest output value of the digital/analog converter D/A which appears in this time. At the end of a period of 24 seconds, this value is then accepted by the sample-and-hold circuit S&H and the input capacitor in the peak detector PD is discharged immediately thereafter. The sample-and-hold circuit S&H is connected by way of an inhibit line sp to the control console KPT of FIG. 2, by way of which line it can be selectively grounded from the control console and, therefore, inhibited.

As FIG. 4 shows, the limit value check modules GUi which respectively represent the outputs of the error channels K1, K2 . . . K7 essentially comprise a threshold circuit SWS having an adjustable threshold and indicate a jump in potential at the output via a trigger circuit (not shown) when the signal at the input side exceeds the threshold. At the same time, the input of the threshold circuit SWS is connected to the output in order to also enable a registration of the signal values at the input side even in the instance when such signal values do not exceed the threshold of the threshold circuit SWS.

FIG. 5 illustrates an embodiment of the limit value check modules GU5 and GU6 employed at the input of the error correction channels K5 and K6. At the input side they comprise the threshold value circuit SWS already explained in connection with FIG. 4 which is followed by an oscillator 0 controlled by the output of the threshold circuit. It becomes possible in this manner to determine the time interval in which the signal to be monitored transgresses the threshold of the threshold circuit SWS within the 1 second periods for the counter Z at the input of the error detection circuits following the limit value check modules in the error channels.

FIG. 6 illustrates a circuit corresponding to FIG. 5 for the limit value check module GU7 at the input of the error channel K7. The limit value check module GU7 differs from the limit value check modules GU5 and GU6 only in that the threshold circuit SWS' therein responds when the analog error signal at the input downwardly transgresses the adjusted threshold.

FIG. 7 illustrates an embodiment of the playing time converter S-Zt. It comprises a shift register SR stepped by the clock T1 to which the time data ZD are supplied at its input. As soon as the shift register SR is filled, the shift register outputs are emitted via a transfer switch su controlled by the clock T2 to a display device AZ in the manner of a serial-parallel conversion and are also emitted to the output which thereby comprises a line group encompassing sixteen lines. The display device AZ is likewise controlled by the clock T2.

Finally, as far as structure is concerned, FIG. 8 illustrates an embodiment of the order number converter BNU which comprises a memory MA. The data D are supplied to the memory MA via a line group consisting of seven lines. Further, the memory MA is controlled with a write clock Ts and an erase clock T1, as well as by control signals St which are supplied via four lines. Here, also, a series-parallel conversion is, so to speak, executed via the control memory MA by way of which a display device AZ is serviced, on the one hand, and the parallel representation of the order number information is emitted, on the other hand, at the output to the interrogation device AE of FIG. 2 via a line group consisting of 32 lines.

Figure 9:
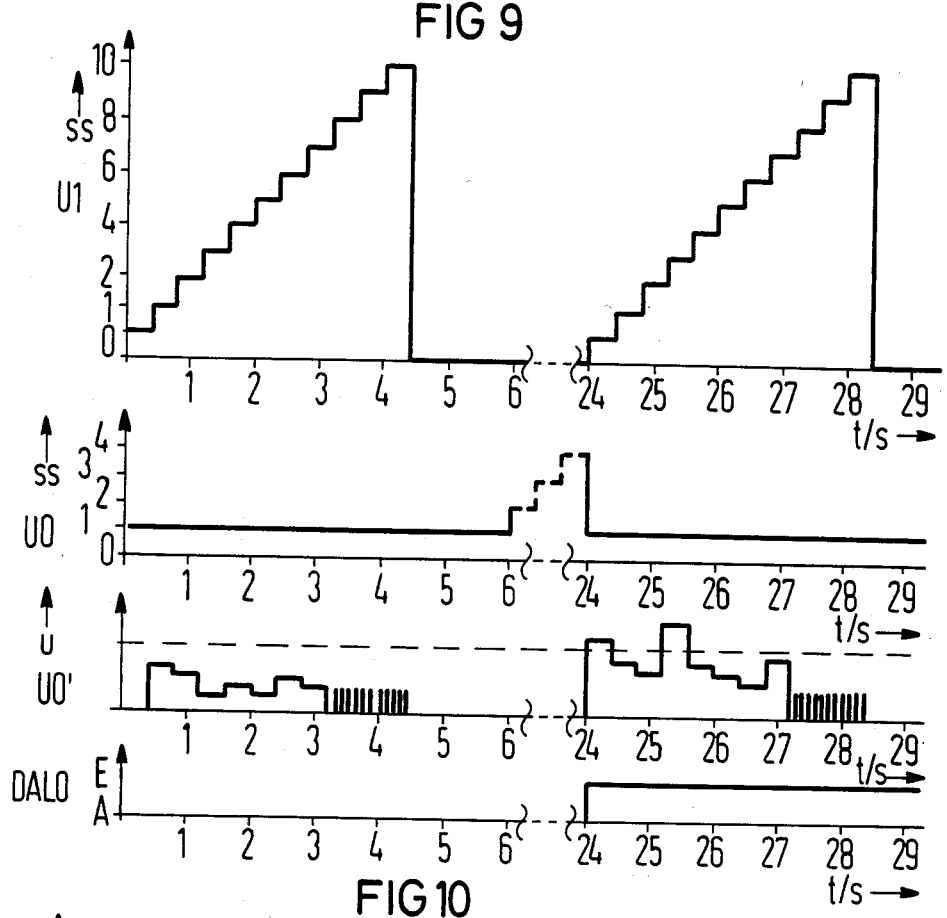
FIGS. 9 and 10 are timing diagrams which explain the manner of operation of the circuit arrangement of FIG. 2 in greater detail.
Figure 10:
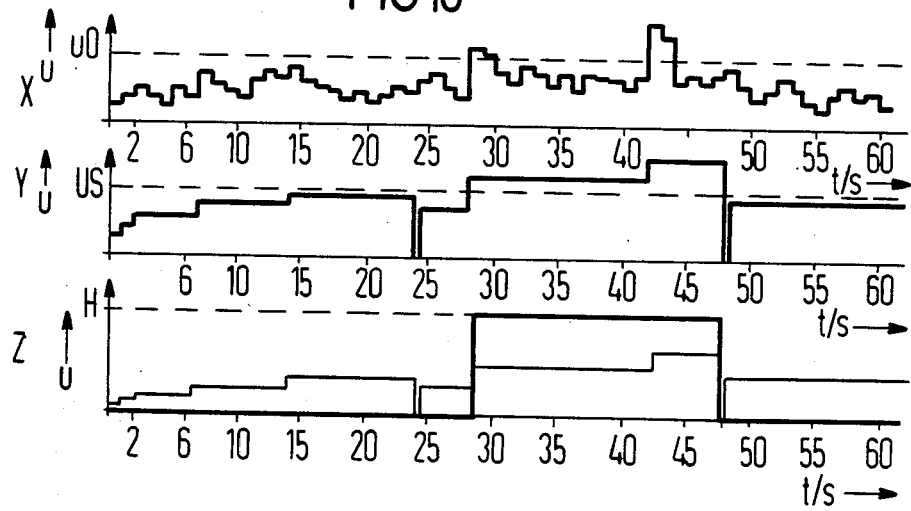

FIGS. 9 and 10 illustrate timing diagrams for a better understanding of the manner of operation of the error interpretation units FAE1, FAE2 ... FAE4 in cooperation with the interrogation device AE and the error registration device DALO.

In FIG. 9, the timing diagram U1 shows the step-by-step interrogation of the error channel output as well as of the output of the number memory for the playback device and the special channels over the time t in seconds. The make-break cycles ss from 0 through 10 are entered on the OR gate. After 4.5 sec, the transfer device U1 has run through all the transfer contacts and then assumes an initial idle position until it begins another run via its control clock TA after 24 sec. This second run in the time from 24 sec to 28.5 sec is likewise illustrated in the diagram U1. The transfer device U2 executes a run in the intervening interval, namely in the interval from 6 sec to 10.5 sec. The transfer devices U3 and U4 start at 12 sec and 18 sec.

As the diagram U0 illustrates, the transfer device U0 switches from one of its four switch positions 1-4 into the next switch position every 6 sec, in order to then begin a new run after 24 sec. The voltage u is entered on the timing diagram U0' over the time t in seconds and it is thereby assumed that no error signal value transgressing the threshold voltage uo appears during the first run of the transfer device U1 in the time from 0 sec to 4.5 sec. Absolutely no voltage is present in the switch position 0 of the transfer device U1 according to FIG. 9 because the OR gate OG does not respond in this case. Some lower voltage values or other appear in the other switch position 1-7 of the transfer device Ul, these voltage values having the form of a step function. Binary characters appear in the switch positions 8-10 which respectively simultaneously cover a plurality of switch contacts. The error registration device DALO is not activated in the time interval between 0 sec and 6 sec because the voltage at the OR gate output is zero during that interval. Let it be assumed in the next run in the time from 24 sec to 28.5 sec that an error channel indicates an error to be registered. This is initially indicated in that a voltage which activates the error registration device now appears in the switch position 0 of the transfer device U1. This activation is now caused by the error channel K3 whose error signal voltage transgresses the threshold voltage u0. It is worth noting in this context that the threshold voltage u0 has been assumed to be identical for all limit value check modules GU1, GU2 ... GU7 only for reasons of simplicity. In practice, of course, the thresholds of the limit value check modules can be differently selected depending on the interpretation deemed necessary for the error signals appearing in the individual error channels.

The bottom diagram in FIG. 9, finally, shows the activation function of the error registration device and is therefore labeled DALO. On the ordinate, A is equal to "out" and E is equal to "in". During the first run of the transfer device U1 in the time interval from 0 sec to 6 sec, the error registration device is in its deactivated condition due to a lack of errors to be registered, whereas it is activated during the next run of the transfer device U1 in the time interval from 24 sec to 30 sec.

FIG. 10 illustrates further timing diagrams which are related to the error channel K1 of FIG. 2 and respectively indicate the curve of the voltage u at the output x of the counter with the decoder Z/D, at the output y of the maximum value memory MM and at the output c of the limit value check module G1, entered over the time t in. seconds. The diagrams are correspondingly labeled X, Y and Z. Since the counter result in analog form only appears at the output x in the spacing of one second due to the clock 1s, it produces the step voltage function shown in the diagram X at the terminal x, the step voltage function transgressing the threshold voltage uo in the time interval between 28 sec and 29 sec and in the time interval between 42 sec and 43 sec. A stepped curve consequently likewise occurs at the output y of the maximum value memory, this step curve, however, only having an ascending trend due to the nature of the maximum value memory and returning to the value 0 at the end of a 24 seconds cycle.

The basic voltage curve present in the diagram Y is likewise present in the diagram Z since, as FIG. 4 illustrates, the terminal y is also directly connected to the terminal z. The output of the actual limit value check module GU1 is first found in the voltage state "L" in which the voltage practically has the value zero. Only at the time 28 sec does the voltage at the terminal y transgress the threshold voltage uo and initiate the limit value check module GU1 to a jump in potential at its output in that its output has the voltage state "H", which thereby has a significantly higher voltage value than the maximum voltage that can possibly appear at the terminal y. Achieved in this manner is that the error registration device DALO can unequivocally recognize the response of the limit value check module.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Apparatus for detecting fabrication errors in the manufacture of high packing density, optically-readable, disc-shaped information carriers having information stored therein in the form of an error-correcting code, comprising:

a playback device for reading the stored information, including an error correction system including error signal outputs and operable to identify and provide signals representing errors at said error signal outputs;

an interface including inputs connected to said error signal outputs and interface outputs;

an error interpretation unit including inputs connected to said interface outputs, a plurality of error channels connected to said inputs of said interpretation unit, each of said channels including clocked detection means operable to detect respective error information in a periodic first cycle and each including a clocked maximum value memory operable to receive and store the error information for a periodic second cycle whose period is a multiple of the period of the first cycle;

a plurality of limit value check modules connected to said maximum value memories for detecting whether the respective information transgresses a respective threshold value;

an error registration device; and an interrogation device connected between said limit value check modules and said error registration device and operable to transfer the outputs of said limit value check modules to said error registration device in a periodic, third cycle whose period is the same as that of the second cycle.

2. The apparatus of claim 1, and further comprising:
a plurality of said playback devices;
a plurality of said interfaces;
a plurality of said error interpretation units each connected to a respective playback device via a respective interface;
each of said error interpretation units connected to said interrogation device to commonly share said error registration device, said interrogation device operable to read said error interpretation units in said third cycle and emit the interrogation results to said error registration device in the form of error channel information blocks pertaining to the individual error interpretation units.

3. The apparatus of claim 1, wherein:

said playback device comprises an optical tracking system operable to produce radius and focus signals;

said error interpretation unit comprises radius and focus error channels; and said optical tracking system is connected to said radius and focus error channels via said interface.

4. The apparatus of claim 1, wherein:

said error interpretation unit further comprises a high frequency error channel;

said playback device comprises a high frequency signal path for the information read from the information carrier; and said high frequency signal path connected to said high frequency error channel via said interface.

5. The apparatus of claim 1, wherein:

said error interpretation unit comprises a playing time channel and an order number channel;

said playback device comprises a sub-code processor operable to form time and order number information; and said interface connects said sub-processor to said time and order number channels of said error interpretation unit, said time and order channel being interrogated by said interrogation device and their information co-employed for the qualification of the error channel information output by said interrogation device to said error registration device.

6. Apparatus according to claim 1, wherein:

said error interpretation unit comprises a number memory for storing the number of the playback device assigned to the error interpretation unit, said number memory connected to and interrogated by said interrogation device.

7. The apparatus of claim 1, and further comprising:
a control console connected to and operable to selectively inhibit said error channels and including a common clock supply for said error interpretation unit and said interrogation device.

8. The apparatus of claim 1, wherein:

said error interpretation unit comprises an OR gate connected to a plurality of said limit value check modules to combine the outputs of a like plurality of said error channels; and said interrogation device comprises a first interrogation position connected to said OR gate and operable to activate said error registration device only for the time and of an interrogatibn cycle when an error signal has been indicated as existing at the output of said OR gate.

9. The apparatus of claim 1, wherein:

said interface comprises means combining a plurality of said error channels to form a common error channel terminal for said interrogation device.

10. The apparatus of claim 1, and further comprising:
means for providing a radial error signal at one of said interface outputs;

said error interpretation unit comprising a pair of channels connected to receive said radial error signal and providing different respective information for interrogation by said interrogation device.

* * * * *